United States Patent
Keller

(10) Patent No.: US 9,915,196 B2
(45) Date of Patent: Mar. 13, 2018

(54) CONTROL ARRANGEMENT OF AN EXHAUST-GAS TURBOCHARGER

(71) Applicant: BorgWarner Inc., Auburn Hills, MI (US)

(72) Inventor: Peter Keller, Osthofen (DE)

(73) Assignee: BorgWarner Inc., Auburn Hills, MI (US)

( * ) Notice: Subject to any disclaimer, the term of this patent is extended or adjusted under 35 U.S.C. 154(b) by 247 days.

(21) Appl. No.: 14/650,689

(22) PCT Filed: Nov. 22, 2013

(86) PCT No.: PCT/US2013/071457
§ 371 (c)(1),
(2) Date: Jun. 9, 2015

(87) PCT Pub. No.: WO2014/092976
PCT Pub. Date: Jun. 19, 2014

(65) Prior Publication Data
US 2015/0330292 A1     Nov. 19, 2015

(30) Foreign Application Priority Data

Dec. 14, 2012 (DE) .......................... 10 2012 024 531

(51) Int. Cl.
*F01D 17/12* (2006.01)
*F02B 37/18* (2006.01)

(52) U.S. Cl.
CPC ............ *F02B 37/186* (2013.01); *F01D 17/12* (2013.01); *F05D 2220/40* (2013.01); *Y02T 10/144* (2013.01)

(58) Field of Classification Search
CPC ...... F01D 17/165; F01D 17/105; F01D 17/12; F01D 11/22; F02B 37/186; F02B 37/183; F05D 2220/40; Y02T 1/144
See application file for complete search history.

(56) References Cited

U.S. PATENT DOCUMENTS 4,770,603 A * 9/1988 Engels .................... F01D 5/141
                                                 415/147
5,947,681 A * 9/1999 Rochford .............. F01D 17/165
                                                 415/150

(Continued)

FOREIGN PATENT DOCUMENTS

DE     202007019447 U1    10/2012
WO    2006046810 A1      5/2006

(Continued)

OTHER PUBLICATIONS

International Search Report in International Application No. PCT/US2013/071457, dated Mar. 7, 2014.

*Primary Examiner* — Logan Kraft
*Assistant Examiner* — Joshua R Beebe
(74) *Attorney, Agent, or Firm* — Eric L. Doyle; Stephan A. Pendorf; Patent Central LLC

(57) ABSTRACT

A control arrangement (1) of an exhaust-gas turbocharger (2), having a bearing bushing (3); having a control shaft (4) which is connected at a first end (5) to a connecting lever (6) and which is guided in the bearing bushing (3); and having a connecting piece (7) which is arranged on the connecting lever (6). The connecting piece (7) is arranged on a lever surface (8), which faces toward the bearing bushing (3), of the connecting lever (6).

8 Claims, 3 Drawing Sheets

(56) References Cited

U.S. PATENT DOCUMENTS

| | | | |
|---|---|---|---|
| 8,172,513 B2 | 5/2012 | Frankenstein et al. | |
| 2005/0079049 A1* | 4/2005 | Ishihara | F02B 37/183 415/182.1 |
| 2006/0213195 A1* | 9/2006 | Leavesley | F02B 37/18 60/605.1 |
| 2012/0234002 A1* | 9/2012 | Lombard | F01D 17/105 60/602 |
| 2012/0317975 A1* | 12/2012 | Schoenherr | F02B 37/183 60/602 |

FOREIGN PATENT DOCUMENTS

| | | |
|---|---|---|
| WO | 2010104695 A2 | 9/2010 |
| WO | 2012047527 A2 | 4/2012 |

\* cited by examiner

CONTROL ARRANGEMENT OF AN EXHAUST-GAS TURBOCHARGER

BACKGROUND OF THE INVENTION

Field of the Invention

The invention relates to a control arrangement of an exhaust-gas turbocharger and to a turbine housing of an exhaust-gas turbocharger.

Description of the Related Art

A control arrangement of said type and a turbine housing of said type are known from DE 20 2007 019 447 U1. Said document describes an exhaust-gas turbocharger having a control arrangement which has a control shaft for the actuation of a wastegate flap by means of an actuator, said control shaft being guided in a bearing bushing and being connected at its free end to an adjustment lever. On a lever surface pointing away from the bearing bushing of the control shaft, there is arranged a connecting piece to which a regulating rod of the actuator is connected.

It is an object of the present invention to provide a control arrangement and a turbine housing with which it is possible for the actuation of the control shaft to be optimized.

BRIEF SUMMARY OF THE INVENTION

By virtue of the fact that the connecting piece is arranged on a lever surface, which faces toward the bearing bushing or toward a turbine wall in which the bearing bushing is arranged, of the connecting lever, it is possible for the actuation of the adjustment shaft to be relocated in the direction of the center of the bearing bushing, which improves the control characteristic of the control arrangement according to the invention and thus of the turbine housing according to the invention.

The dependent claims contain advantageous developments of the invention.

BRIEF DESCRIPTION OF THE SEVERAL VIEWS OF THE DRAWINGS

Further details, advantages and features of the present invention become apparent from the following description of an exemplary embodiment with reference to the drawing, in which.

DETAILED DESCRIPTION OF THE INVENTION

Figure 1:
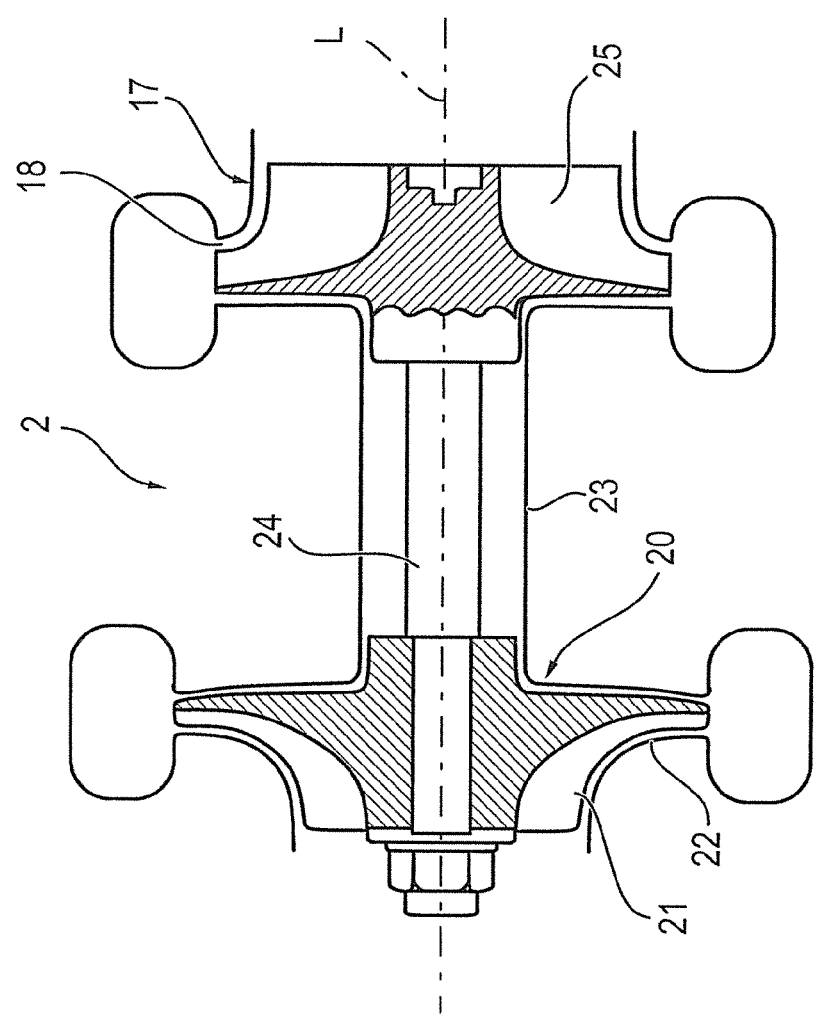
FIG. 1 is a schematically highly simplified diagrammatic illustration of an exhaust-gas turbocharger according to the invention which can be provided with a control arrangement according to the invention and with a turbine housing according to the invention.

FIG. 1 is a schematically highly simplified diagrammatic illustration of an exhaust-gas turbocharger 2 according to the invention which may have a turbine housing 17, which will be described on the basis of FIG. 3, and a control arrangement, which will be explained below on the basis of FIG. 2.

As is conventional, the turbocharger 2 has a compressor 20 with a compressor wheel 21 in a compressor housing 22, has the turbine housing 17 with a turbine wheel 25 and with a bypass opening 18, and also has a bearing housing 23 that connects the compressor housing 22 and the turbine housing 17. In the bearing housing 23 there is mounted a shaft 24 which, at its ends, bears the compressor wheel 21 and the turbine wheel 25 respectively.

Figure 2:
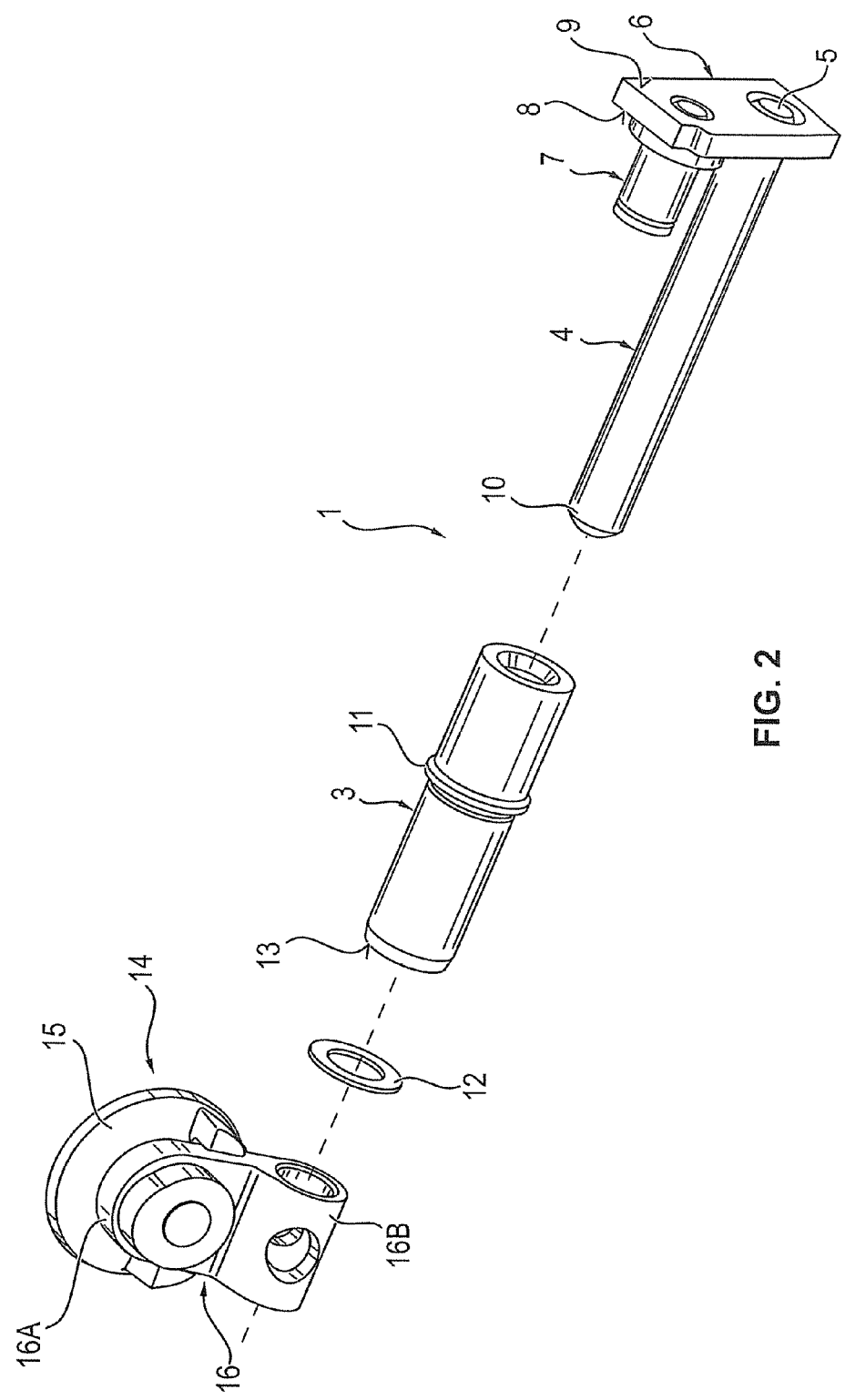
FIG. 2 shows an exploded illustration of a perspective view of the control arrangement according to the invention.

FIG. 2 is a perspective exploded illustration of a control arrangement 1 according to the invention which can be used in an exhaust-gas turbocharger 2 of said type.

The control arrangement 1 has a bearing bushing 3 which is of cylindrical form in the example and which, on its outer circumferential surface, has an annular stop 11.

Furthermore, the control arrangement 1 has a control shaft 4 which is connected at a first end 5 to a connecting lever 6. As shown in FIG. 2, the connecting lever 6 has a lever surface 8 facing toward the bearing bushing 3 and a lever surface 9 pointing away from the bearing bushing 3. On the lever surface 8 facing toward the bearing bushing 3, there is arranged a connecting piece 7 which may for example be connected to a regulating rod of a pneumatic controller.

In the particularly preferred embodiment illustrated in FIG. 2, the control arrangement 1 also has a spacer disk 12 which, in the mounted state, lies against a face surface 13 of the bearing bushing 3.

The control arrangement 1 may for example be connected to a control device 14 which is likewise illustrated in FIG. 2, said control device in the illustrated example having a wastegate flap 15 which is arranged on a first end 16A of a flap lever 16.

The end 16B of the flap lever 16 is designed to receive the end 10 of the control shaft 4, such that in the final mounted state, the spacer disk 12 is arranged between the end 16B and the face surface 13 of the bearing bushing 3.

The control device 14 illustrated in FIG. 2 in the form of a wastegate arrangement is merely one example for a control device that can interact, by means of the control arrangement 1 according to the invention, with an actuator which is not illustrated in the figures. The use of the control arrangement 1 is however not restricted to a combination with a wastegate arrangement on a turbine housing, such as is illustrated in FIG. 3.

Figure 3:
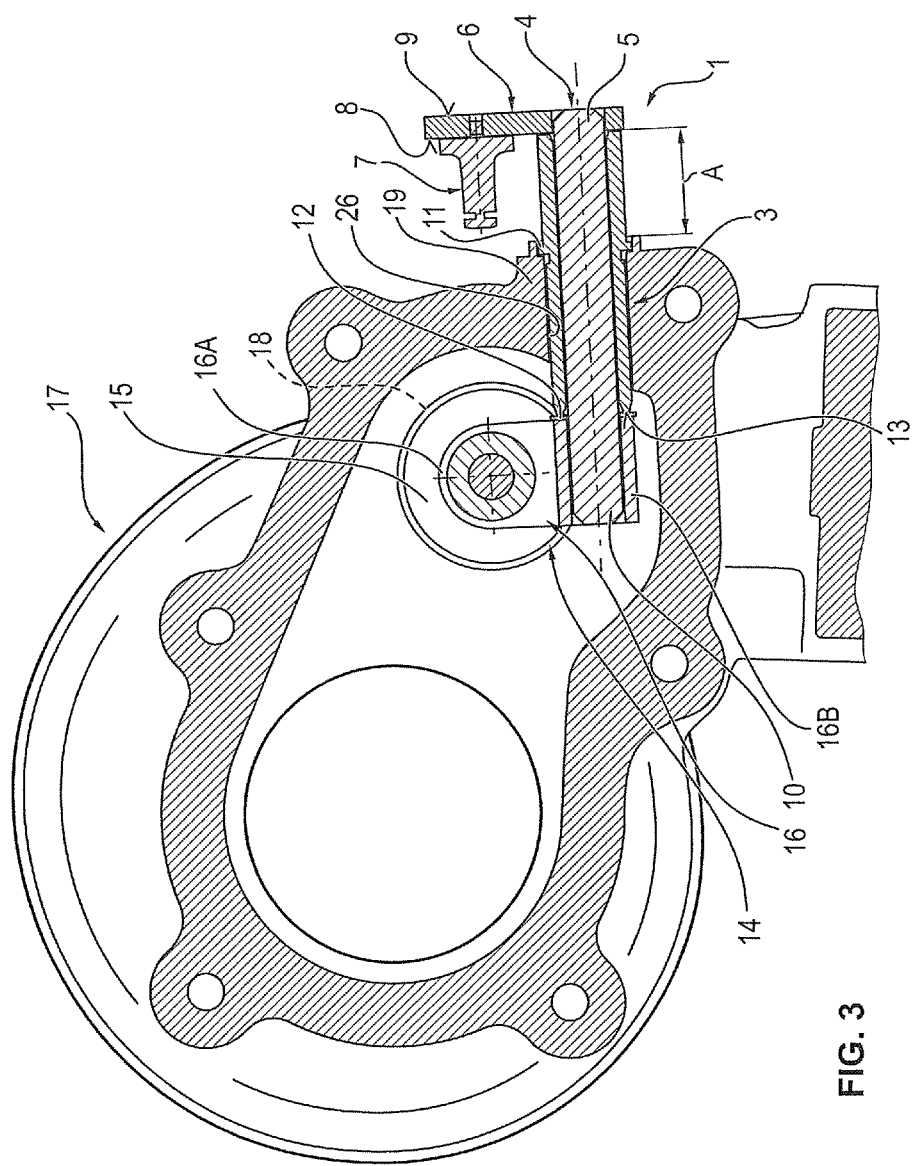
FIG. 3 shows a sectional illustration through a turbine housing according to the invention.

The turbine housing 17 illustrated in FIG. 3 is provided with the control arrangement 1 that has been described on the basis of FIG. 2. All of the components of said control arrangement 1 that have been described on the basis of FIG. 2 are denoted by the same reference numerals in FIG. 3. As is also shown in FIG. 3, the wastegate flap 15 closes a bypass opening 18, or opens said bypass opening 18 when correspondingly actuated by the above-mentioned actuator which is however not illustrated in FIG. 3, the control rod of which actuator engages on the connecting piece 7.

FIG. 3 shows that the bearing bushing 3 is arranged in a passage recess 26 in a housing wall 19 of the bearing housing 17, and bears by way of its stop 11 against a face surface of said housing wall 19. FIG. 3 also shows here that, when the control arrangement 1 is in the mounted state in the turbine housing 17, the connecting piece 7 points toward said housing wall 19 and thus likewise faces toward the bearing bushing 3, whereas the lever surface 9 points away from said components, as is readily apparent from FIG. 3.

The distance A also indicated in FIG. 3 shows that, owing to this orientation of the connecting piece 17 in the direction of the housing wall 19 or the bearing bushing 3, the bearing bushing 3 can be lengthened significantly in relation to the prior art, which firstly improves the guidance of the control shaft 4 and secondly optimizes the actuation of the control shaft 4, because said actuation can be relocated in the direction of the center of the bearing bushing 3 owing to the elongation thereof explained above.

In addition to the above written description of the invention, reference is hereby explicitly made, for additional disclosure thereof, to the diagrammatic illustration of the invention in FIGS. 1 to 3.

LIST OF REFERENCE SIGNS

1 Control arrangement
2 Exhaust-gas turbocharger
3 Bearing bushing
4 Control shaft
5 First end of the control shaft
6 Connecting lever
6A First end of the connecting lever
6B Second end of the connecting lever
7 Connecting piece
8 Lever surface facing toward the bearing bushing 3
9 Averted lever surface
10 Second end of the control shaft 4
11 Stop
12 Spacer disk
13 Face surface
14 Control device
15 Wastegate flap
16 Flap lever
17 Turbine housing
18 Bypass opening
19 Housing wall
20 Compressor
21 Compressor wheel
22 Compressor housing
23 Bearing housing
24 Shaft
25 Turbine wheel
L Longitudinal axis of the exhaust-gas turbocharger
A Distance

The invention claimed is:

1. A control arrangement (1) for a wastegate of an exhaust-gas turbocharger (2), having
a bearing bushing (3) having a cylindrical circumferential surface with an annular stop (11) on its cylindrical circumferential surface, a bushing inboard end and a bushing outboard end;
a connecting lever (6);
a control shaft (4) which is connected at a first end (5) to the connecting lever (6) and at a second end to a wastegate and which is guided in the bearing bushing (3); and
a connecting piece (7) for transmitting actuation forces to a connecting lever (6) is arranged on the connecting lever (6),
wherein the bearing bushing (3) is seated from its bushing inboard end to its annular stop (11) in a wall (19) of the exhaust-gas turbocharger (2) and projects a distance (A) from its annular stop (11) to its bushing outboard end outside of the turbine housing, and
the connecting piece (7) is arranged on a lever surface (8) which faces toward the housing wall (19) such that actuation forces are transmitted from the connecting piece (7) to the bearing bushing (3) in the region of the bearing bushing (3) between the annular stop (11) and the outboard end.

2. The control arrangement as claimed in claim 1, wherein a spacer disk (12) is provided laid into a face surface (13) of the bearing bushing (3).

3. The control arrangement as claimed in claim 1, wherein a control device (14) is arranged on a second end (10) of the control shaft (4).

4. The control arrangement as claimed in claim 3, wherein the control device (14) has a wastegate flap (15) which is mounted on a flap lever (16) which is fixed to the second end (10) of the control shaft (4).

5. A turbine housing (17) of an exhaust-gas turbocharger (2), having
a wastegate bypass opening (18); and
a control device (14) which is operatively connected to a control arrangement (1) which has the following components:
a bearing bushing (3) having a cylindrical circumferential surface with an annular stop (11) on its cylindrical circumferential surface, a bushing inboard end and a bushing outboard end;
a connecting lever (6);
a control shaft (4) which is connected at a first end (5) to the connecting lever (6) and at a second end to a wastegate associated with the wastegate bypass opening (18) and which control shaft is guided in the bearing bushing (3); and
a connecting piece (7) for transmitting actuation forces to a connecting lever (6) is fixed on the connecting lever (6),
wherein the bearing bushing (3) is seated from its bushing inboard end to its annular stop (11) in a wall (19) of the exhaust-gas turbocharger (2) and projects a distance (A) from its annular stop (11) to its bushing outboard end outside of the turbine housing, and
the connecting piece (7) is fixed on a lever surface (8) which faces toward the housing wall (19) such that actuation forces are transmitted from the connecting piece (7) to the bearing bushing (3) in the region of the bearing bushing (3) between the annular stop (11) and the outboard end.

6. The turbine housing as claimed in claim 5, wherein a spacer disk (12) is provided laid into a face surface (13) of the bearing bushing (3).

7. The turbine housing as claimed in claim 5, wherein a control device (14) is arranged on a second end (10) of the control shaft (4).

8. The turbine housing as claimed in claim 7, wherein the control device (14) has a wastegate flap (15) which is mounted on a flap lever (16) which is fixed to the second end (10) of the control shaft (4).

* * * * *